US010783162B1

(12) United States Patent
Montague et al.

(10) Patent No.: US 10,783,162 B1
(45) Date of Patent: Sep. 22, 2020

(54) WORKFLOW ASSISTANT

(71) Applicant: Palantir Technologies Inc., Palo Alto, CA (US)

(72) Inventors: David Montague, East Palo Alto, CA (US); Brandon Marc-Aurele, Arlington, VA (US); Clare Adrien, Palo Alto, CA (US); Eric Jeney, Washington, DC (US); Daniel O'Malley, Palo Alto, CA (US); Vincent Tilson, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 336 days.

(21) Appl. No.: 15/877,166

(22) Filed: Jan. 22, 2018

Related U.S. Application Data

(60) Provisional application No. 62/595,877, filed on Dec. 7, 2017.

(51) Int. Cl.
| | | |
|---|---|---|
| *G06F 16/20* | (2019.01) | |
| *G06F 16/26* | (2019.01) | |
| *G06F 16/248* | (2019.01) | |
| *G06F 16/2458* | (2019.01) | |
| *G06F 16/901* | (2019.01) | |
| *G06T 11/20* | (2006.01) | |
| *G06F 3/0484* | (2013.01) | |

(52) U.S. Cl.
CPC ............ *G06F 16/26* (2019.01); *G06F 16/248* (2019.01); *G06F 16/2465* (2019.01); *G06F 16/9024* (2019.01); *G06F 3/04842* (2013.01); *G06T 11/206* (2013.01)

(58) Field of Classification Search
None
See application file for complete search history.

(56) References Cited

U.S. PATENT DOCUMENTS

| | | |
|---|---|---|
| 5,241,625 A | 8/1993 | Epard et al. |
| 5,418,950 A | 5/1995 | Li et al. |
| (Continued) | | |

FOREIGN PATENT DOCUMENTS

| | | |
|---|---|---|
| CN | 102546446 | 7/2012 |
| CN | 103167093 | 6/2013 |
| (Continued) | | |

OTHER PUBLICATIONS

"A Quick Guide to UniProtKB Swiss-Prot & TrEMBL," Sep. 2011, pp. 2.

(Continued)

*Primary Examiner* — Jau Shya Meng
(74) *Attorney, Agent, or Firm* — Sheppard Mullin Richter & Hampton LLP

(57) ABSTRACT

Systems, methods, and non-transitory computer readable media may provide workflow assistance for performing operations on information. Information defining a graph may be accessed and a set of operations for the graph may be provided. The graph may represent objects with nodes and connections among the objects with edges. A user's selection of one or more operations from the set of operations may be received. A workflow of operations for the graph may be generated based on the user's selection. The workflow of operations may include the operation(s) selected by the user.

14 Claims, 8 Drawing Sheets

(56) References Cited

U.S. PATENT DOCUMENTS

| | | | |
|---|---|---|---|
| 5,428,737 A | 6/1995 | Li et al. | |
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,774,661 A * | 6/1998 | Chatterjee | G06F 9/5038 709/203 |
| 5,794,228 A | 8/1998 | French et al. | |
| 5,794,229 A | 8/1998 | French et al. | |
| 5,845,300 A | 12/1998 | Comer | |
| 5,857,329 A | 1/1999 | Bingham | |
| 5,911,138 A | 6/1999 | Li et al. | |
| 5,918,225 A | 6/1999 | White et al. | |
| 6,065,026 A | 5/2000 | Cornelia et al. | |
| 6,208,985 B1 | 3/2001 | Krehel | |
| 6,232,971 B1 | 5/2001 | Haynes | |
| 6,236,994 B1 | 5/2001 | Swartz et al. | |
| 6,237,138 B1 | 5/2001 | Hameluck et al. | |
| 6,243,706 B1 | 6/2001 | Moreau et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,430,305 B1 | 8/2002 | Decker | |
| 6,523,019 B1 | 2/2003 | Borthwick | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,944,821 B1 | 9/2005 | Bates et al. | |
| 6,976,024 B1 | 12/2005 | Chavez et al. | |
| 6,978,419 B1 | 12/2005 | Kantrowitz | |
| 7,085,890 B2 | 8/2006 | Kashyap | |
| 7,168,039 B2 | 1/2007 | Bertram | |
| 7,174,377 B2 | 2/2007 | Bernard et al. | |
| 7,392,254 B1 | 6/2008 | Jenkins | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,617,232 B2 | 11/2009 | Gabbert et al. | |
| 7,627,489 B2 | 12/2009 | Schaeffer et al. | |
| 7,657,540 B1 | 2/2010 | Bayliss | |
| 7,765,489 B1 | 7/2010 | Shah | |
| 7,783,679 B2 | 8/2010 | Bley | |
| 7,853,573 B2 | 12/2010 | Warner et al. | |
| 7,877,421 B2 | 1/2011 | Berger et al. | |
| 7,880,921 B2 | 2/2011 | Dattilo et al. | |
| 7,899,796 B1 | 3/2011 | Borthwick et al. | |
| 7,900,052 B2 | 3/2011 | Jonas | |
| 7,908,521 B2 | 3/2011 | Sridharan et al. | |
| 7,917,376 B2 | 3/2011 | Bellin et al. | |
| 7,941,321 B2 | 5/2011 | Greenstein et al. | |
| 7,941,336 B1 | 5/2011 | Robin-Jan | |
| 7,958,147 B1 | 6/2011 | Turner et al. | |
| 7,966,199 B1 | 6/2011 | Frasher et al. | |
| 7,979,424 B2 | 7/2011 | Dettinger et al. | |
| 8,036,971 B2 | 10/2011 | Aymeloglu et al. | |
| 8,046,283 B2 | 10/2011 | Burns et al. | |
| 8,054,756 B2 | 11/2011 | Chand et al. | |
| 8,073,857 B2 | 12/2011 | Sreekanth | |
| 8,103,962 B2 | 1/2012 | Embley et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,365,068 B2 * | 1/2013 | Brandt | G06F 8/34 715/234 |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,473,454 B2 | 6/2013 | Evanitsky et al. | |
| 8,484,115 B2 | 7/2013 | Aymeloglu et al. | |
| 8,499,287 B2 | 7/2013 | Shafi et al. | |
| 8,560,494 B1 | 10/2013 | Downing | |
| 8,589,273 B2 | 11/2013 | Creeden et al. | |
| 8,639,552 B1 | 1/2014 | Chen et al. | |
| 8,682,696 B1 | 3/2014 | Shanmugam | |
| 8,688,573 B1 | 4/2014 | Ruknoic et al. | |
| 8,732,574 B2 | 5/2014 | Burr et al. | |
| 8,799,313 B2 | 8/2014 | Satlow | |
| 8,812,960 B1 | 8/2014 | Sun et al. | |
| 8,909,597 B2 | 12/2014 | Aymeloglu et al. | |
| 8,924,388 B2 | 12/2014 | Elliot et al. | |
| 8,924,389 B2 | 12/2014 | Elliot et al. | |
| 8,924,429 B1 | 12/2014 | Fisher et al. | |
| 8,935,201 B1 | 1/2015 | Fisher et al. | |
| 8,938,686 B1 | 1/2015 | Erenrich et al. | |
| 8,984,390 B2 | 3/2015 | Aymeloglu et al. | |
| 9,058,315 B2 | 6/2015 | Burr et al. | |
| 9,348,880 B1 | 5/2016 | Kramer et al. | |
| 9,547,923 B2 | 1/2017 | Nevin, III | |
| 2002/0032677 A1 | 3/2002 | Morgenthaler et al. | |
| 2002/0065708 A1 | 5/2002 | Senay et al. | |
| 2002/0083039 A1 | 6/2002 | Ferrari | |
| 2002/0095360 A1 | 7/2002 | Joao | |
| 2002/0095658 A1 | 7/2002 | Shulman | |
| 2002/0103705 A1 | 8/2002 | Brady | |
| 2002/0147805 A1 | 10/2002 | Leshem et al. | |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0036927 A1 | 2/2003 | Bowen | |
| 2003/0105833 A1 | 6/2003 | Daniels | |
| 2003/0126102 A1 | 7/2003 | Borthwick | |
| 2004/0034570 A1 | 2/2004 | Davis | |
| 2004/0044648 A1 | 3/2004 | Anfindsen et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153418 A1 | 8/2004 | Hanweck | |
| 2004/0205492 A1 | 10/2004 | Newsome | |
| 2004/0236688 A1 | 11/2004 | Bozeman | |
| 2004/0239674 A1 | 12/2004 | Ewald et al. | |
| 2005/0004911 A1 | 1/2005 | Goldberg et al. | |
| 2005/0010472 A1 | 1/2005 | Quatse et al. | |
| 2005/0021397 A1 | 1/2005 | Cui et al. | |
| 2005/0028094 A1 | 2/2005 | Allyn | |
| 2005/0039116 A1 | 2/2005 | Slack-Smith | |
| 2005/0086207 A1 | 4/2005 | Heuer et al. | |
| 2005/0091186 A1 | 4/2005 | Elish | |
| 2005/0120080 A1 | 6/2005 | Weinreb et al. | |
| 2005/0125715 A1 | 6/2005 | Di Franco et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0026120 A1 | 2/2006 | Carolan et al. | |
| 2006/0026561 A1 | 2/2006 | Bauman et al. | |
| 2006/0031779 A1 | 2/2006 | Theurer et al. | |
| 2006/0053170 A1 | 3/2006 | Hill et al. | |
| 2006/0059423 A1 | 3/2006 | Lehmann et al. | |
| 2006/0070046 A1 | 3/2006 | Balakrishnan et al. | |
| 2006/0074967 A1 | 4/2006 | Shaburov | |
| 2006/0080139 A1 | 4/2006 | Mainzer | |
| 2006/0080616 A1 | 4/2006 | Vogel et al. | |
| 2006/0116991 A1 | 6/2006 | Calderwood | |
| 2006/0129746 A1 | 6/2006 | Porter | |
| 2006/0136513 A1 | 6/2006 | Ngo et al. | |
| 2006/0142949 A1 | 6/2006 | Helt | |
| 2006/0143075 A1 | 6/2006 | Carr et al. | |
| 2006/0143079 A1 | 6/2006 | Basak et al. | |
| 2006/0178915 A1 | 8/2006 | Chao | |
| 2006/0209085 A1 | 9/2006 | Wong et al. | |
| 2006/0265417 A1 | 11/2006 | Amato et al. | |
| 2006/0271884 A1 | 11/2006 | Hurst | |
| 2006/0277460 A1 | 12/2006 | Forstall et al. | |
| 2006/0288046 A1 | 12/2006 | Gupta et al. | |
| 2007/0000999 A1 | 1/2007 | Kubo et al. | |
| 2007/0005582 A1 | 1/2007 | Navratil et al. | |
| 2007/0011304 A1 | 1/2007 | Error | |
| 2007/0022107 A1 | 1/2007 | Yuan et al. | |
| 2007/0027851 A1 | 2/2007 | Kruy et al. | |

(56) References Cited

U.S. PATENT DOCUMENTS

| | | |
|---|---|---|
| 2007/0043686 A1 | 2/2007 | Teng et al. |
| 2007/0061752 A1 | 3/2007 | Cory |
| 2007/0094248 A1 | 4/2007 | McVeigh et al. |
| 2007/0113164 A1 | 5/2007 | Hansen et al. |
| 2007/0130206 A1 | 6/2007 | Zhou et al. |
| 2007/0136095 A1 | 6/2007 | Weinstein |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0245339 A1 | 10/2007 | Bauman et al. |
| 2007/0260582 A1 | 11/2007 | Liang |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0071731 A1 | 3/2008 | Ma et al. |
| 2008/0077598 A1 | 3/2008 | Wilmering et al. |
| 2008/0091693 A1 | 4/2008 | Murthy |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0201313 A1 | 8/2008 | Dettinger et al. |
| 2008/0215543 A1 | 9/2008 | Huang et al. |
| 2008/0222295 A1 | 9/2008 | Robinson et al. |
| 2008/0249820 A1 | 10/2008 | Pathria |
| 2008/0255973 A1 | 10/2008 | El Wade et al. |
| 2008/0267386 A1 | 10/2008 | Cooper |
| 2008/0313132 A1 | 12/2008 | Hao et al. |
| 2009/0006150 A1 | 1/2009 | Prigge et al. |
| 2009/0007056 A1 | 1/2009 | Prigge et al. |
| 2009/0024589 A1 | 1/2009 | Sood et al. |
| 2009/0043762 A1 | 2/2009 | Shiverick et al. |
| 2009/0043801 A1 | 2/2009 | LeClair |
| 2009/0055487 A1 | 2/2009 | Moraes et al. |
| 2009/0083275 A1 | 3/2009 | Jacob et al. |
| 2009/0089651 A1 | 4/2009 | Herberger et al. |
| 2009/0094217 A1 | 4/2009 | Dettinger et al. |
| 2009/0106178 A1 | 4/2009 | Chu |
| 2009/0112745 A1 | 4/2009 | Stefanescu |
| 2009/0125459 A1 | 5/2009 | Norton et al. |
| 2009/0144747 A1 | 6/2009 | Baker |
| 2009/0150868 A1 | 6/2009 | Chakra et al. |
| 2009/0161147 A1 | 6/2009 | Klave |
| 2009/0172674 A1 | 7/2009 | Bobak et al. |
| 2009/0187546 A1 | 7/2009 | Whyte et al. |
| 2009/0187548 A1 | 7/2009 | Ji et al. |
| 2009/0187556 A1 | 7/2009 | Ross et al. |
| 2009/0193012 A1 | 7/2009 | Williams |
| 2009/0199106 A1 | 8/2009 | Jonsson et al. |
| 2009/0248721 A1 | 10/2009 | Burton et al. |
| 2009/0248757 A1 | 10/2009 | Havewala et al. |
| 2009/0249244 A1 | 10/2009 | Robinson et al. |
| 2009/0252046 A1 | 10/2009 | Canright et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0299830 A1 | 12/2009 | West et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0073315 A1 | 3/2010 | Lee et al. |
| 2010/0082671 A1 | 4/2010 | Li et al. |
| 2010/0098318 A1 | 4/2010 | Anderson |
| 2010/0145902 A1 | 6/2010 | Boyan et al. |
| 2010/0161646 A1 | 6/2010 | Ceballos et al. |
| 2010/0161735 A1 | 6/2010 | Sharma |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0199167 A1 | 8/2010 | Uematsu et al. |
| 2010/0223260 A1 | 9/2010 | Wu |
| 2010/0262688 A1 | 10/2010 | Hussain et al. |
| 2010/0280851 A1 | 11/2010 | Merkin |
| 2010/0313239 A1 | 12/2010 | Chakra et al. |
| 2011/0035396 A1 | 2/2011 | Merz et al. |
| 2011/0041084 A1 | 2/2011 | Karam |
| 2011/0061013 A1 | 3/2011 | Bilicki et al. |
| 2011/0066497 A1 | 3/2011 | Gopinath et al. |
| 2011/0074811 A1 | 3/2011 | Hanson et al. |
| 2011/0078173 A1 | 3/2011 | Seligmann et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0131547 A1 | 6/2011 | Elaasar |
| 2011/0153384 A1 | 6/2011 | Horne et al. |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0208822 A1 | 8/2011 | Rathod |
| 2011/0225482 A1 | 9/2011 | Chan et al. |
| 2011/0252282 A1 | 10/2011 | Meek et al. |
| 2011/0258190 A1 | 10/2011 | Chen et al. |
| 2011/0258216 A1 | 10/2011 | Supakkul et al. |
| 2011/0270604 A1 | 11/2011 | Qi et al. |
| 2011/0270871 A1 | 11/2011 | He et al. |
| 2011/0289397 A1 | 11/2011 | Eastmond et al. |
| 2011/0314007 A1 | 12/2011 | Dassa et al. |
| 2012/0004894 A1 | 1/2012 | Butler |
| 2012/0011238 A1 | 1/2012 | Rathod |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084184 A1 | 4/2012 | Raleigh |
| 2012/0102022 A1 | 4/2012 | Miranker et al. |
| 2012/0131512 A1 | 5/2012 | Takeuchi et al. |
| 2012/0150873 A1 | 6/2012 | Tokai |
| 2012/0159312 A1 | 6/2012 | Mital et al. |
| 2012/0159362 A1 | 6/2012 | Brown et al. |
| 2012/0173381 A1 | 7/2012 | Smith |
| 2012/0174057 A1 | 7/2012 | Narendra et al. |
| 2012/0188252 A1 | 7/2012 | Law |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0221553 A1 | 8/2012 | Wittmer et al. |
| 2012/0226590 A1 | 9/2012 | Love et al. |
| 2012/0278273 A1 | 11/2012 | Fang |
| 2012/0284719 A1 | 11/2012 | Phan et al. |
| 2012/0323888 A1 | 12/2012 | Osann, Jr. |
| 2013/0016106 A1 | 1/2013 | Yip et al. |
| 2013/0054551 A1 | 2/2013 | Lange |
| 2013/0096968 A1 | 4/2013 | Van Pelt et al. |
| 2013/0096988 A1 | 4/2013 | Grossman et al. |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185307 A1 | 7/2013 | El-Yaniv et al. |
| 2013/0198624 A1 | 8/2013 | Aymeloglu et al. |
| 2013/0226944 A1 | 8/2013 | Baid et al. |
| 2013/0232220 A1 | 9/2013 | Sampson |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2014/0012796 A1 | 1/2014 | Petersen et al. |
| 2014/0012886 A1 | 1/2014 | Downing et al. |
| 2014/0040371 A1 | 2/2014 | Gurevich et al. |
| 2014/0068487 A1 | 3/2014 | Steiger et al. |
| 2014/0074888 A1 | 3/2014 | Potter et al. |
| 2014/0095509 A1 | 4/2014 | Patton |
| 2014/0108074 A1 | 4/2014 | Miller et al. |

(56) References Cited

U.S. PATENT DOCUMENTS

| | | |
|---|---|---|
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0123279 A1 | 5/2014 | Bishop et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222793 A1 | 8/2014 | Sadkin et al. |
| 2014/0244284 A1 | 8/2014 | Smith |
| 2014/0330845 A1 | 11/2014 | Feldschuh |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2014/0379755 A1 | 12/2014 | Kuriakose et al. |
| 2015/0073954 A1 | 3/2015 | Braff |
| 2015/0100897 A1 | 4/2015 | Sun et al. |
| 2015/0106379 A1 | 4/2015 | Elliot et al. |
| 2015/0188872 A1 | 7/2015 | White |
| 2015/0254220 A1 | 9/2015 | Burr et al. |
| 2015/0254329 A1 | 9/2015 | Agarwal et al. |
| 2017/0031565 A1* | 2/2017 | Chauhan ............ G06F 3/04847 |
| 2017/0310623 A1* | 10/2017 | Sjolander ................ H04L 51/04 |
| 2018/0032571 A1 | 2/2018 | Potter et al. |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| EP | 1647908 | 4/2006 |
| EP | 1672527 | 6/2006 |
| EP | 2 634 745 | 9/2013 |
| EP | 2743839 | 6/2014 |
| EP | 2778986 | 9/2014 |
| EP | 2858018 | 4/2015 |
| EP | 2869211 | 5/2015 |
| EP | 2889814 | 7/2015 |
| EP | 2892197 | 7/2015 |
| GB | 2366498 | 3/2002 |
| GB | 2508503 | 1/2015 |
| GB | 2508293 | 4/2015 |
| NZ | 616212 | 5/2015 |
| WO | WO 2000/034895 | 6/2000 |
| WO | WO 2001/088750 | 11/2001 |
| WO | WO 2010/030913 | 3/2010 |
| WO | WO 2010/030914 | 3/2010 |
| WO | WO 2010/030917 | 3/2010 |
| WO | WO 2012/119008 | 9/2012 |

OTHER PUBLICATIONS

"A Tour of Pinboard," <http://pinboard.in/tour> as printed May 15, 2014 in 6 pages.

"GrabUp—What a Timesaver!" <http://atlchris.com/191/grabup/>, Aug. 11, 2008, pp. 3.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"The FASTA Program Package," fasta-36.3.4, Mar. 25, 2011, pp. 29.

Abbey, Kristen, "Review of Google Docs," May 1, 2007, pp. 2.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Anonymous, "Frequently Asked Questions about Office Binder 97," http://web.archive.org/web/20100210112922/http://support.microsoft.com/kb/843147 printed Dec. 18, 2006 in 5 pages.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bae et al., "Partitioning Algorithms for the Computation of Average Iceberg Queries," DaWaK 2000, LNCS 1874, pp. 276-286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bluttman et al., "Excel Formulas and Functions for Dummies," 2005, Wiley Publishing, Inc., pp. 280, 284-286.

Bogle et al., "Reducing Cross-Domain Call Overhead Using Batched Futures," SIGPLAN No. 29, Oct. 10, 1994 pp. 341-354.

Bogle, Phillip Lee, "Reducing Cross-Domain Call Overhead Using Batched Futures," May 1994, Massachusetts Institute of Technology, pp. 96.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Cohn, et al., "Semi-supervised clustering with user feedback," Constrained Clustering: Advances in Algorithms, Theory, and Applications 4.1 (2003): 17-32.

Conner, Nancy, "Google Apps: The Missing Manual," May 1, 2008, pp. 15.

Countly Mobile Analytics, <http://count.ly/> Printed Jul. 18, 2013 in 9 pages.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

DISTIMO—App Analytics, <http://www.distimo.com/app-analytics> Printed Jul. 18, 2013 in 5 pages.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Flurry Analytics, <http://www.flurry.com/> Printed Jul. 18, 2013 in 14 pages.

Galliford, Miles, "SnagIt Versus Free Screen Capture Software: Critical Tools for Website Owners," <http://www.subhub.com/articles/free-screen-capture-software>, Mar. 27, 2008, pp. 11.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

(56) References Cited

OTHER PUBLICATIONS

Gu et al., "Record Linkage: Current Practice and Future Directions," Jan. 15, 2004, pp. 32.
Han et al., "Efficient Computation of Iceberg Cubes with Complex Measures," ACM Sigmod, May 21-24, 2001, pp. 1-12.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
JetScreenshot.com, "Share Screenshots via Internet in Seconds," <http://web.archive.org/web/20130807164204/http://www.jetscreenshot.com/>, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Mendes et al., "TcruziKB: Enabling Complex Queries for Genomic Data Exploration," IEEE International Conference on Semantic Computing, Aug. 2008, pp. 432-439.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mixpanel—Mobile Analytics, <https://mixpanel.com/> Printed Jul. 18, 2013 in 13 pages.
Mizrachi, Ilene, "Chapter 1: Gen Bank: The Nuckeotide Sequence Database," The NCBI Handbook, Oct. 2002, pp. 1-14.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, http://oreilly.com/digitalmedia/2006/01/01/mac-os-x-screenshot-secrets.html published Jan. 1, 2006 in 10 pages.
Piwik—Free Web Analytics Software. <http://piwik.org/> Printed Jul. 19, 2013 in 18 pages.
Russell et al., "NITELIGHT: A Graphical Tool for Semantic Query Construction," 2008, pp. 10.
Schroder, Stan, "15 Ways To Create Website Screenshots," <http://mashable.com/2007/08/24/web-screenshots/>, Aug. 24, 2007, pp. 2.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep.Ê29-Oct. 3, 2008, pp. 16.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Stamos et al., "Remote Evaluation," Journal ACM Transactions on Programming Languages and Systems (TOPLAS) vol. 12, Issue 4, Oct. 1990, pp. 537-564.
StatCounter—Free Invisible Web Tracker, Hit Counter and Web Stats, <http://statcounter.com/> Printed Jul. 19, 2013 in 17 pages.
TestFlight—Beta Testing On The Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Machine Code", p. 1-5, printed Aug. 11, 2014.

* cited by examiner

WORKFLOW ASSISTANT

CROSS REFERENCE TO RELATED APPLICATIONS

This application claims the benefit under 35 U.S.C. § 119(e) of U.S. Provisional Application Ser. No. 62/595,877 filed Dec. 7, 2017, the content of which is incorporated by reference in its entirety into the present disclosure.

FIELD OF THE INVENTION

This disclosure relates to approaches for providing workflow assistance for performing operations on information.

BACKGROUND

Under conventional approaches, a user may configure operations (parallel operations, sequential operations) to be performed on information (e.g., graph). For example, a user may manually configure operations to expand a graph, shrink a graph, search for particular nodes/edges in a graph, and/or find one or more connections in a graph. Such configuration of operations to be performed on the information may be difficult and time consuming.

SUMMARY

Various embodiments of the present disclosure may include systems, methods, and non-transitory computer readable media configured to provide workflow assistance for performing operations on information. A system may access information defining a graph and provide a set of operations for the graph. The graph may represent objects with nodes and connections among the objects with edges. The system may receive a user's selection of one or more operations from the set of operations. The system may generate a workflow of operations for the graph based on the user's selection. The workflow of operations may include the operation(s) selected by the user.

In some embodiments, the set of operations may include a set of macros. The set of operations for the graph may be provided based on at least a portion of the graph.

In some embodiments, providing the set of operations for the graph may include displaying a workflow generation interface. The workflow generation interface may enable the user to search for existing operations. The workflow generation interface may further enable the user to create new operations. The workflow generation interface may further enable the user to view a result of applying a given operation on the graph.

In some embodiments, the result of applying the given operation on the graph may include a difference between the graph before the application of the given operation on the graph and the graph after the application of the given operation on the graph.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
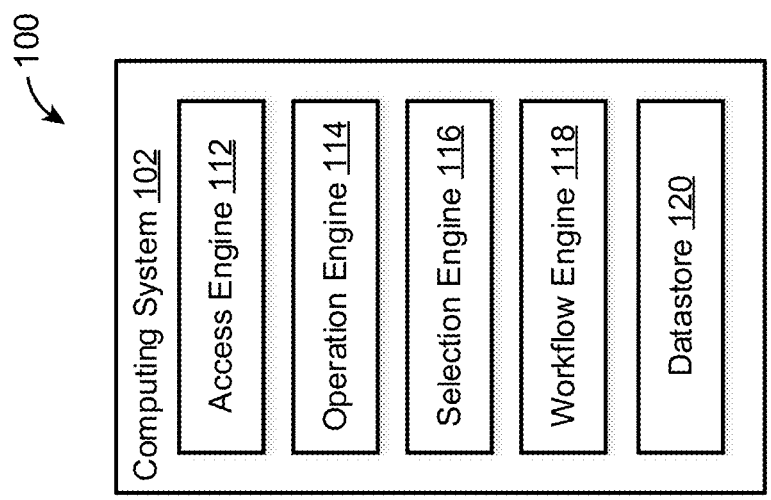
FIG. 1 illustrates an example environment for providing workflow assistance for performing operations on information, in accordance with various embodiments.

A claimed solution rooted in computer technology overcomes problems specifically arising in the realm of computer technology. In various implementations, a system may access information defining a graph. The graph may represent objects with nodes and connections among the objects with edges. The system may provide a set of operations for the graph and receive a user's selection of one or more operations from the set of operations. The system may generate a workflow of operations for the graph based on the user's selection. The workflow of operations may include the one or more operations selected by the user. The workflow of operations may be reused and/or shared between different users.

In some embodiments, the set of operations for the graph may be provided based on at least a portion of the graph. The set of operations may include a set of macros. A given macro may perform one or more operations. The workflow of operations may include a chain of multiple macros. In some instances, a given macro may include multiple macros.

In some embodiments, providing the set of operations for the graph may include displaying a workflow generation interface. The workflow generation interface may enable the user to search for existing operations. The workflow generation interface may enable the user to create new operations. The workflow generation interface may enable the user to modify/customize one or more operations (e.g., define parameters of an operation). The workflow generation interface may suggest one or more operations for selection by the user and/or suggest one or more parameters of a given operation. For example, the workflow generation interface may suggest a particular operation for selection by the user based on other selected operations and/or properties associated with the graph/portion of the graph. As another example, the workflow generation interface may suggest particular parameters for a given operation based on other selected operations/parameters and/or properties associated with the graph/portion of the graph.

In some embodiments, the workflow generation interface may enable the user to view a result of applying a given operation on the graph, such as a difference between the graph before the application of the given operation on the graph and the graph after the application of the given operation on the graph. The workflow generation interface may enable a user to view the provenance of changes within the graph.

In some embodiments, processing of one or more operations within a workflow may be performed locally and/or remotely. For example, a portion of operations within a workflow may be executed by a local computing device while another portion of operations within the workflow may be executed by a remote computing device. One or more portions of operations within a workflow may be federated out for execution.

The approach disclosed herein enables generation/management/customization of workflows of operations on information. The approached disclosed herein provides an interface that enables users to select operations on information, see results of applying individual operations on information, modify selections of operations (e.g., add, remove, change order of operations), and generate/modify workflows of operations on information. One or more external operations (e.g., operations executed by remote computing devices) may be provided for use through the interface, giving users flexibility to use operations of external computing devices/libraries. Outputs of operations may be provided to integrated applications for use within the integrated applications and inputs for operations may be received from integrated applications. Workflows of operations may be shared among users and enable users to benefit from other users' expertise. Sharing of workflows of operations may enable users to build a library of institutional knowledge to share with other users.

FIG. 1 illustrates an example environment 100 for providing workflow assistance for performing operations on information, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The environment 100 may also include one or more datastores that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing device 102 may include an access engine 112, an operation engine 114, a selection engine 116, a workflow engine 118, and a datastore 120. The datastore 120 may include structured and/or unstructured sets of data/information that can be divided/extracted for provisioning when needed by one or more components. The datastore 120 may include one or more databases. The datastore 120 may include different data analysis/processing modules that facilitate different data analysis/processing tasks, and/or other information to be used in the environment 100. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the access engine 112 is configured to access one or more types of information. The access engine 112 may access different types of information. For example, the access engine 112 may access information defining a graph. A graph may represent objects with nodes and connections (links) among the objects with edges. Access of other types of information are contemplated. Accessed information may include information for which one or more operations are desired. Information may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). In some embodiments, information may be stored in one or more databases/datastores, such as the datastore 120. Information may be stored within a single file or across multiple files.

For example, the access engine 112 may access information relating to one or more subjects, such as persons, events, accounts, and/or things. Information regarding a subject may be organized using one or more particular structures. For example, information may be organized as one or more tables/data frames, with values relating to the subject being stored within a particular location (e.g., row, column) within the table(s) based on the characteristics to which the values relate. For example, information relating to individual persons may be separated into separate rows (or columns) and individual characteristics relating to the persons (e.g., name, gender, address, phone number, employment, accounts, location) may be separated into separate columns (or rows). Information may define a graph where nodes of the graph represent different objects (e.g., persons, accounts) and edges between the nodes represent connection between the objects. While aspects of the disclosure is described herein with respect to information relating to persons/graphs, this is merely for illustrative purposes and is not meant to be limiting. Other types/organizations of information are contemplated.

In various embodiments, the operation engine 114 is configured to provide one or more sets of operations for the accessed information. For example, the operation engine 114 may provide one or more sets of operations for a graph defined by the accessed information. A set of operations may refer to a grouping of one or more operations. A set of operations may include processes that use the information, analyze the information, the modify information (e.g., change the information, create new information based on the information, delete the information, combine the information with other information), visualize the information (e.g., in a graph, in a plot, in a table, in a chart, in a map), and/or other operations for the information. In some embodiments, operations provided by the operation engine 114 may be specific to the information (e.g., the type of information accessed), the user (e.g., the type of user, user's access level), the use-case (e.g., project-based operations), and/or other information. The operations provided by the operation engine 114 may be selected by users to generate one or more workflow of operations for the information (e.g., a graph). For example, one or more nodes/connections within a graph may be identified, created, removed, and/or modified in a single step or in multiple steps based on users' selection of operations provided by the operation engine 114. As another example, a graph defined by the accessed information may be transformed into a different shape (e.g., change in size, change in node(s), change in connection(s)) in a single step or in multiple steps based on users' selection of operations provided by the operation engine 114.

In some embodiments, a set of operations may include a set of macros. A macro may refer to an instruction that includes/expands into a set of instructions to perform one or more particular tasks. That is, a given macro may perform one or more operations. In some instance, a given macro may include multiple macros. For example, a given macro may include two different macros, which may be executed individually (without the other) or in combination, such as in parallel or sequentially. For example, a given macro may include operation(s) to search around a given node, search around a given node using geographic characteristics (e.g., finding objects that were in the same location), search around a given node using temporal characteristics (e.g., finding objects that were created within a particular time of another object), search around a given node using geo-temporal characteristics (e.g., finding objects that were in the same location at/near the same time), search using hard-links (e.g., finding neighboring nodes within a given hop that is established to be linked to a given node), search using soft-links (e.g., finding neighboring nodes within a given hop that shares a property of a given node), search within a graph for nodes/connections based on filters, traverse connections between nodes based on connection type, search around using object type, find a path between two nodes, find a shortest path between two nodes, find a particular type of connection between nodes, find neighboring nodes of a given node, use federated/distributed resources, add node(s)/connection( ) to a graph, remove node(s)/connection(s) from a graph, modify node(s)/connection(s) in a graph, determine intersection of graphs/graph portions, determine union of graphs/graph portions, and/or other operations.

Two or more operations/macros may be chained together to form a larger macro/workflow. For example, a given macro may include an operation/macro to search around a node within a graph based on links and an operation/macro to search based on object types (e.g., person), and the given macro may be used to search around a given node of a graph for persons. As another example, a given macro may include operations to search around a given node for connections/nodes with particular properties (e.g., search around for accounts associated with a particular name/number near a given node).

In some embodiments, an output of a given operation/macro may be provided as an input to a subsequent operation/macro. In some embodiments, operations that require a particular ordering may be contained within a single macro. For example, a desired transformation of a graph may require three operations, with a subsequent operation using as input the output of a preceding operation. Separating such operations into separate macros may require users to manually set the correct ordering of the three operations, and may provide for complexity in the use of the macros. Such macros may be chained within a single macro such that users are able to execute the desired transformation by making a call to the single macro.

In some embodiments, types of operations provided by the operation engine 114 may depend on one or more configuration files. Configuration(s) may be described in a JavaScript Object Notation (JSON) object, which may be used to generate schema and forms. In some embodiments, one or more operations/macros may be configured with specific values. In some embodiments, one or more operations/macros may be configured using JSON or YAML. Other configuration and formatting/language of operations/macros are contemplated.

In some embodiments, the operation engine 114 may provide operations within one or more libraries. A library may include a collection of operations and the operation engine 114 may provide the collection of operations based on availability of the library. In some embodiments, the operation engine 114 may provide access to external operations after the relevant library (or relevant portion of the library) including the operations has been accessed/imported. As another example, a given operations may be provided by the operation engine 114 based on the operation engine 114 sending one or more portions of the information to an external process/library that processes the information according to the desired operation(s) and returns the results of the operation(s) to the operation engine 114. Providing access to external operations may give users greater flexibility in selecting operations for workflows, may allow users to use external operations within workflows, and/or may allow users to offload one or more portions of the workflows' processes to external resources (e.g., external operation, external library, external computing system).

The set(s) of operations for the information may be provided through one or more interfaces (e.g., users interface(s), application program interface(s)). For example, a user interface may provide a listing of operations available to operate on the information. The user interface may include a search field enabling users to search for particular operations. Users may use the search field to search for particular operations based on names of operations, keywords of operations, transformations/processes performed by operations, and/or other information relating to operations. The user interface may include a recent field providing a list of recent operations selected/used by users. In some embodiments, the recent field may provide a list of recent operations within a given project. That is, the recent field may provide different lists of recent operations for different projects. The user interface may include a browse field enabling users to browse for operations. For example, the browse field may enable users to browse for operations alphabetically, based on operation type, based on filters, and/or other information.

In some embodiments, the set(s) of operations for the information may be provided based on one or more portions of the information. The operation engine 114 may identify the types of operations that may be performed on the information or portion(s) of the information, and provide the identified operations. For example, different types of operation may be performed for a graph of persons versus a graph of events, and the operation engine 114 may provide different sets of operations based on whether the information accessed defines a graph of persons versus a graph of events. As another example, the interface(s) providing the operations may allow users to select one or more portions of the information, such as particular node(s) and/or particular edge(s). The operation engine 114 may identify the types of operations that may be performed on the selected portion(s) of the information and may provide the identified operations. For example, the operation engine 114 may provide different sets of operations based on whether a portion of a graph which is selected for operation includes persons (e.g., selection of node(s) representing person(s)) and/or events (e.g., selection of node(s) representing event(s)).

In some embodiment, the operations identified for information/portion(s) of information may be tied to one or more properties contained within the information. For example, different nodes representing persons may be associated with different properties. The operation engine 114 may identify the types of operations that may be performed based on the availability of the different properties and may provide the identified operations. For example, the operation engine 114 may provide different sets of operations based on the nodes being associated with phone number properties versus bank account properties. Other provision of operations based on portion(s) of information are contemplated.

In some embodiments, providing the set(s) of operations may include suggesting the set(s) of operations. The set of operations may be suggested based on at least a portion of the information or a historical usage of the set of operations. In some embodiments, suggesting a set of operations may include ranking/prioritizing the more likely to be used operations above the less likely to be used operations. For example, the operation engine 114 may list the identified operations in the order of importance/likely usage based on the information within the selected portion and/or based on frequency of prior usage of given operations with respect to the accessed information, similar information, the workflow, and/or similar workflows. In some embodiments, the set of operations may be provided with the number of times the same/similar operations have been used for the accessed information/portion of the information, similar information, the workflow and/or similar workflows. Such provision of the set(s) of operations may allow users to see operations that are relevant to the information that is being accessed/manipulated, and may provide guidance in building workflow of operations.

In some embodiments, providing the set(s) of operations may include suggesting one or more parameters for the set(s) of operations. For example, different operations may take in different types of variable, such as strings, numbers, different measurement units, and one or more parameters for the set(s) of operations may be suggested based on at least a portion of the information or a historical usage of the set of operations. For example, based on an input/variable to the operation including a distance (e.g., a geographical distance to search for neighboring nodes) using a particular measurement, the operation engine 114 may prompt users enter a value for the input/variable using the particular measurement. As another example, based on a given value being historically used with a given operation, the operation engine 114 may suggest the given value or prefill the given value for the input/variable.

In some embodiments, particular operations may be provided/suggested based on users' selection of one or more given operations, and/or particular parameters may be provided/suggested based on users' selection of given parameters for given operation(s). For example, a particular parameter may be frequently selected for use with a given parameter within a given operation, and based on users' selection of the given parameter as a variable for the given operation, the operation engine 114 may suggest selection of the particular parameter as another variable for the given operation. As another example, a particular operation may frequently follow the selection of a given operation, and based on users' selection of the given operation, the operation engine 114 may suggest the selection of the particular operation as the next operation. In some embodiments, one or more operations/parameters may be suggested based on ordering of operations/parameters selected by users. For example, the operation engine 114 may suggest different operations based on users' selection of operation A followed by operation B versus users' selection of operation B followed by operation A.

In some embodiments, an interface through which set(s) of operation are provided may include a workflow generation interface. The workflow generation interface may include one or more features and/or enable one or more functionalities of interfaces discussed above. The workflow generation interface may provide views (e.g., listings) of operations. The workflow generation interface may provide views of operations within one or more libraries, and may allow users to select/import/export the relevant libraries. The listing of operations may be used by users to select one or more operations for inclusion in a workflow of operations. The workflow generation interface may enable users to modify the selected operations, such as adding a new operation, removing an existing operation, and/or modifying an order of the operations.

The workflow generation interface may enable users to search for existing operations. The workflow generation interface may enable users to create new operations. For example, the workflow generation interface may enable users to code new operations, modify an existing operation and save it as a new operation, and/or combine multiple operations as a new operation. The workflow generation interface may enable users to modify/customize one or more operations (e.g., define parameters of an operation). The workflow generation interface may suggest one or more operations for selection by users and/or suggest one or more parameters of a given operation. For example, the workflow generation interface may suggest a particular operation for selection by users based on other selected operations and/or properties associated with the graph/portion of the graph. As another example, the workflow generation interface may suggest particular parameters for a given operation based on other selected operations/parameters and/or properties associated with the graph/portion of the graph.

In some embodiments, the workflow generation interface may enable users create/modify multiple workflows of operations at the same time. The workflow generation interface may enable users to combine/chain workflows together to enable generation of more detailed workflows. Such interface may provide for resource savings by allowing users to take advantage of existing workflows.

The workflow generation interface may enable users to view a result of applying a given operation on the information. For example, the workflow generation interface may enable users to view a result of applying a given operation on a graph (e.g., entire graph, a portion of the graph). The workflow generation interface may provide views of information before and after application of one or more operations on the information (e.g., before and after graph transformation). Such views may provide previews of applying the operations/workflows on the information and may allow users to run individual operations to check the accuracy/desirability of the corresponding results. For example, a result of applying a given operation on a graph may include a difference between the graph before the application of the given operation on the graph and the graph after the application of the given operation on the graph. Graph differences may allow users to determine what has been added/removed/modified in the graph, may allow users to identify where particular changes to the graph occurred, and may provide feedback on returns of particular operations. In some embodiments, transformations of a graph by operations may be presented in a block diagram. The block diagram may include blocks providing views of the graph after application of individual operations (e.g., intermediary graphs), and edges connecting the blocks providing views of changes between the blocks. Such presentation of graph differences may enable users to locate/view provenance of changes (e.g., macro results) within the graph. The workflow generation interface may enable users to create branching operations from one or more intermediary graphs.

In various embodiments, the selection engine 116 is configured to receive a user's selection of one or more operations from the set(s) of operations. The user's selection of operation(s) may be received through one or more interfaces (e.g., users interface(s), application program interface (s)). For example, the selection engine 116 may receive the user's selection of the operation(s) based on the user's interaction with a user interface. The selection engine 116 may receive the user's selection of the operation(s) based on a user's searching for particular operations (e.g., searching for a given operation and selecting one of the listed operations). The selection engine 116 may receive the user's selection of one or more operations created/modified by the user (e.g., through the workflow generation interface). The selection engine 116 may receive the user's selection of the operation(s) provided based on the information/portion(s) of the information. Other selections of operations are contemplated.

In some embodiments, the selection engine 116 may provide information (e.g., warning) based on improper/incomplete selection of operation(s). For example, a user may have selected an unsupported operation for a graph (e.g., operation cannot be fully executed based on the information) and/or may have alter the ordering of operations such that outputs of a preceding operation is no longer compatible with input requirements of a subsequent operation. Based on the improper/incomplete selection of operations, the selection engine may provide a warning that the selected operation(s) cannot be performed. In some embodiments, the selection engine 116 may identify the missing/incompatible information/operation(s) so that the user may change the selection of operations.

In various embodiments, the workflow engine 118 is configured to generate one or more workflows of operations for the information based on the user's selection. A workflow of operations may include one or more operations selected by the user. For example, the workflow of operations may include one or more operations on one or more portions of a graph. The workflow of operations may define an order in which the operations are applied to information. In some embodiments, the workflow engine 118 may optimize the ordering of operations to reduce the costs (e.g., processing, time, memory) of running the operations. The workflow of operations may include a linear workflow or a branching workflow. In some embodiments, a workflow of operations may include a chain of multiple macros, where output of one or more macros are provided as input to one or more other macros. In some embodiments, intermediate and/or final results of the workflow of operations may be provided as input to other applications. For example, an intermediate and/or a final result of a particular workflow of operations may be provided to a mapping application to generate a geographical view of the result. Such a view may enable users to see if certain geographical pattern exists in the result. Integration with other types of applications are contemplated.

Workflows of operations may enable automation of multiple tasks on information, such as information defining a graph. For example, a workflow of operation may automate searching for a path between two nodes on a graph. Two nodes on a graph may represent objects of interest (e.g., persons of interest) and the path between them may provide information on how those objects of interest are connected. However, manually finding a path between two nodes on a graph may be difficult and include repetitive use of same/similar operations. For instance, two nodes may not have a hard-linked (established) path between them and may only be connected through a soft-linked (shared property) path. For example, two persons may be linked to each other based on being at the same location at the same time. That is, the nodes share the same geo-temporal property. However, such a connection may not be found without searching for matching properties of the nodes, such as by searching cell phone tower pings associated with the persons. Finding a path between such nodes may require use of the graph, a map, and performing filtering on key events (e.g., filtering geo-temporal information corresponding to particular events). It may take a long time to manually code such operations, and there may not be any guarantee that a path exist between two nodes in a graph.

The workflow engine 118 may generate workflows of operations to automate such tasks. For example, a workflow of operations may chain together a series of tasks to expand the graph and a search within the expanded graph to find the connection(s) between two nodes. The series of tasks may include one or more of a hard-link search around operation to expand the graph around individual nodes based on established links of a given node to neighboring nodes, a soft-link search around operation to expand the graph around individual nodes based on shared properties of a given node to neighboring nodes, a union operation to merge graph portions around individual nodes and/or an intersect operation to find overlapping nodes/connections between graph portions around individual nodes. A path within the expanded graph may be found between the two nodes. In some implementations, the path to be found may be restricted to a certain size/number of hops.

As another example, a workflow of operations may chain together a series of tasks to find a particular type of activity/object within a time/geographic range of some event. The series of tasks may include a filter operation to identify particular type(s) of activity and a filter operation to identify activity/object within a given time/distance of an event. Such a workflow may be used to identify things that may be potentially relevant to the event. For example, such a workflow may be used to identify logins to a server within a certain time duration of an online activity.

In some embodiments, a workflow of operations may filter the results of operations based one or more parameters to tailor the results for individual users/projects. Such filtering of results of operations may provide for search results that go beyond providing linkage of objects to providing linked objects that may be relevant. For example, a particular user/project may be interested in persons who are of particular nationality/citizenship and have been to a particular country within a date range, and the workflow of operations may filter the results of operations based on associated parameters. As another example, a particular user/project may be interested in persons who speak a particular language and who have first or second level links to a particular person, and the workflow of operations may filter the results of operations based on associated parameters. As another example, a particular user/project may be interested in particular category of information. Objects of interests within the category of information may be gathered within a particular folder, and the workflow of operation may filter the results based on matching properties of the results with properties of objects within the particular folder.

In some embodiments, the workflow of operations may be displayed on the workflow generation interface. For example, the operations selected by users may be displayed within a portion of the workflow generation interface, with the operations listed in a given order based on users' selections. Users may use the displayed workflow to make changes to the workflow and/or the displayed operations. Users may use the displayed workflow to add a new operation (to the beginning, to the end, or within the workflow), remove an existing operation from the workflow, or rearrange the order of the operations within the workflow. Users may use the displayed workflow to view information regarding the operations within the workflow (e.g., properties of operations, arguments/variables of operations, configurations of operations, transformations by operations) and/or to modify the configurations of the operations within the workflows.

The workflow of operations may be reused and/or shared between different users. For example, a team of users may share team-specific workflows of operations such that one of the team members may use workflows of operations created/modified by another team member. Such sharing of workflow of operations may enable new team members to benefit from the team's expertise, rather than having to be trained individually on individual operations. Such sharing of workflow of operations may also enable users to build a library of institutional knowledge to share with other users. In some embodiments, one or more alert services may be used to alert users when a particular workflow of operations is changed and/or when a result of a particular workflow of operations changes.

In some embodiments, processing of one or more operations within a workflow may be performed locally and/or remotely. That is, a portion of operations within a workflow may be executed by a local computing device (e.g., the computing system 102) while another portion of operations within the workflow may be executed by a remote computing device. The computing system 102 may federate out execution of macros/parts of macros to a remote computing system. For example, the computing system 102 may federate searches for particular nodes within a graph to take advantage of remote computing resources. That is, searches for nodes within a graph may be federated and the results may be returned to the computing system 102. For example, automatic entity extraction from documents may be federated to create soft links for nodes within a graph. Federating operations within a workflow may enable discovery of links between nodes based on information within external databases.

Federating operations within a workflow may enable processing of operation of more quickly by taking advantage of external processing power and/or external database. That is, federating operations within a workflow may use the processing capabilities of external computers to run searches in a database and/or use the processing capabilities of a processor of an external database to run searches within the external database without importing the external database. Federating operations within a workflow may enable usage of software written in different languages. That is, a particular operation that is federated out may be expected to return results in a particular format, and the external software may be written using a language different from those of the internal software as long as the external software returns the results in the particular format. In some embodiments, a conversion process may be used to convert the formatting of inputs/outputs exchanged with external software. Federating operations within a workflow may enable usage of third-party software to handle one or more portions of the operations.

Figure 2:
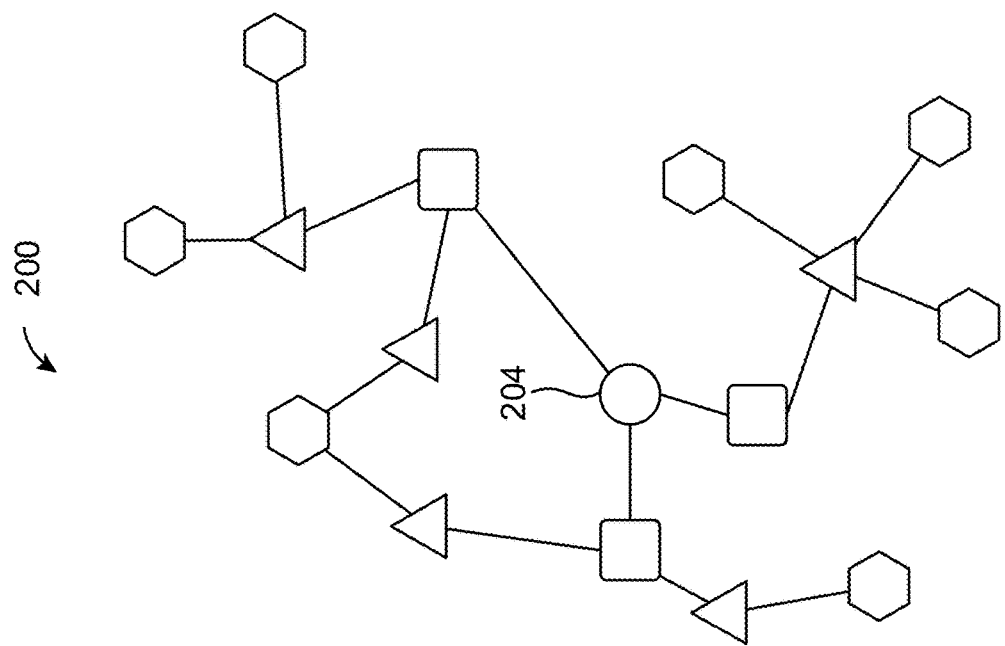
FIG. 2 illustrates an example expansion of a graph, in accordance with various embodiments.
Figure 2:
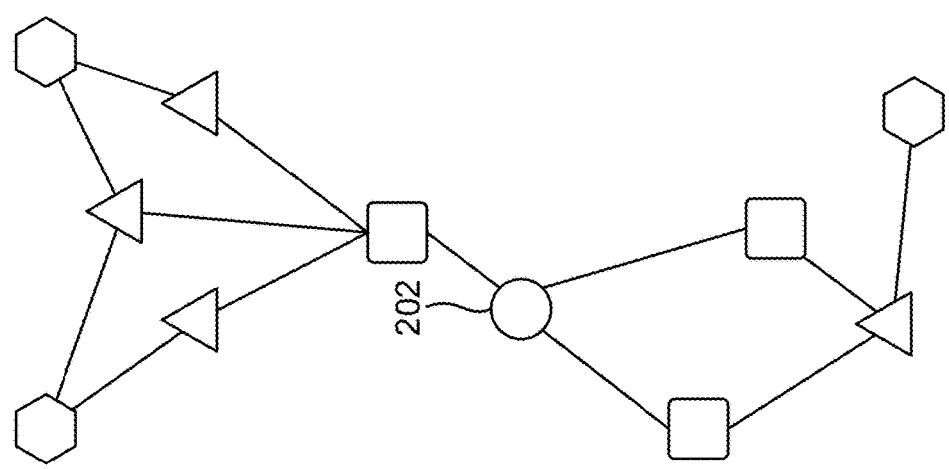

FIG. 2 illustrates an example expansion of a graph 200, in accordance with various embodiments. The graph 200 may include nodes 202, 204. The nodes 202, 204 may represent objects of interest, such as persons of interest. A user may desire to find paths between the nodes 202, 204 to determine connection between the objects. The user may expand the graph around the nodes 202, 204 based on neighboring nodes and attempt to expand the graph until a connection exist between the nodes 202, 204. For example, the squares in the graph 200 may represent results of a first search around operation from the nodes 202, 204, the triangles in the graph 200 may represent results of a second search around operation from the results of the first search around operation, and the hexagons in the graph 200 may represent results of a third search around operation from the results of the second search around operation. Manually executing search around operations around individual nodes may be time consuming, and may not result in a graph that includes a path between the nodes 202, 204.

Figure 3A:
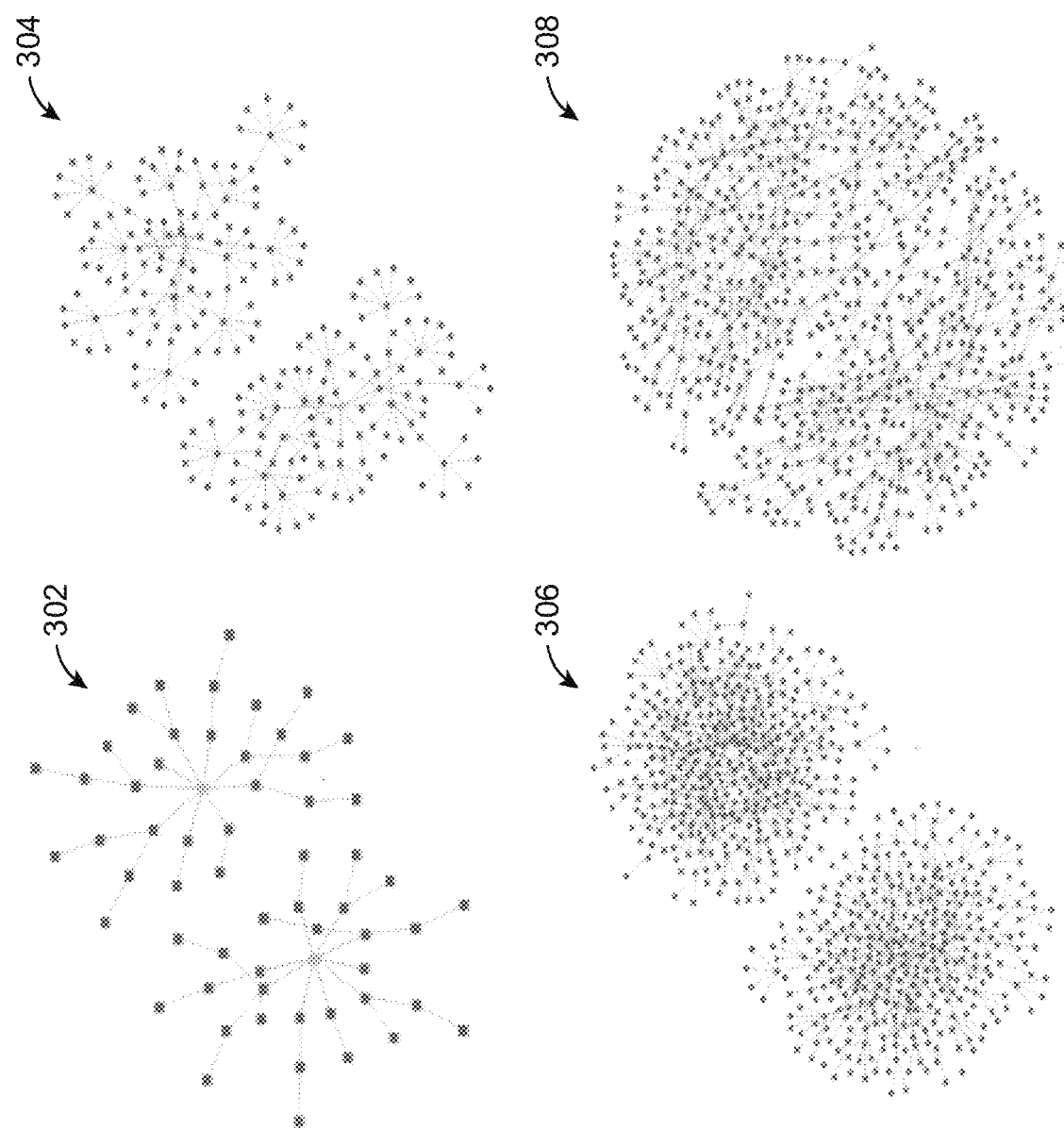
FIG. 3A illustrates other example expansions of a graph, in accordance with various embodiments.

FIG. 3A illustrates example expansions 302, 304, 306, 308 of a graph, in accordance with various embodiments. The expansions 302, 304, 306, 308 of the graph may be results of a workflow of operations. The workflow of operations may expand the graph based on one or more of a hard-link search around operation and/or a soft-link search around operation to expand the graph. The portions of the graph may be combined via a union operation to merge two portions of the graph and/or an intersect operation to find overlapping nodes/connections between graph portions. For example, the expansion 302 may include hard/soft link search around operations to expand the graph around two nodes, creating two branching groups of nodes. The expansions 304, 306 may show the expansion in the size of the two branching groups of nodes based on additional search around operations. The expansion 308 may show the final size of graph with the two branching groups of nodes merged into a single group of nodes.

Figure 3B:
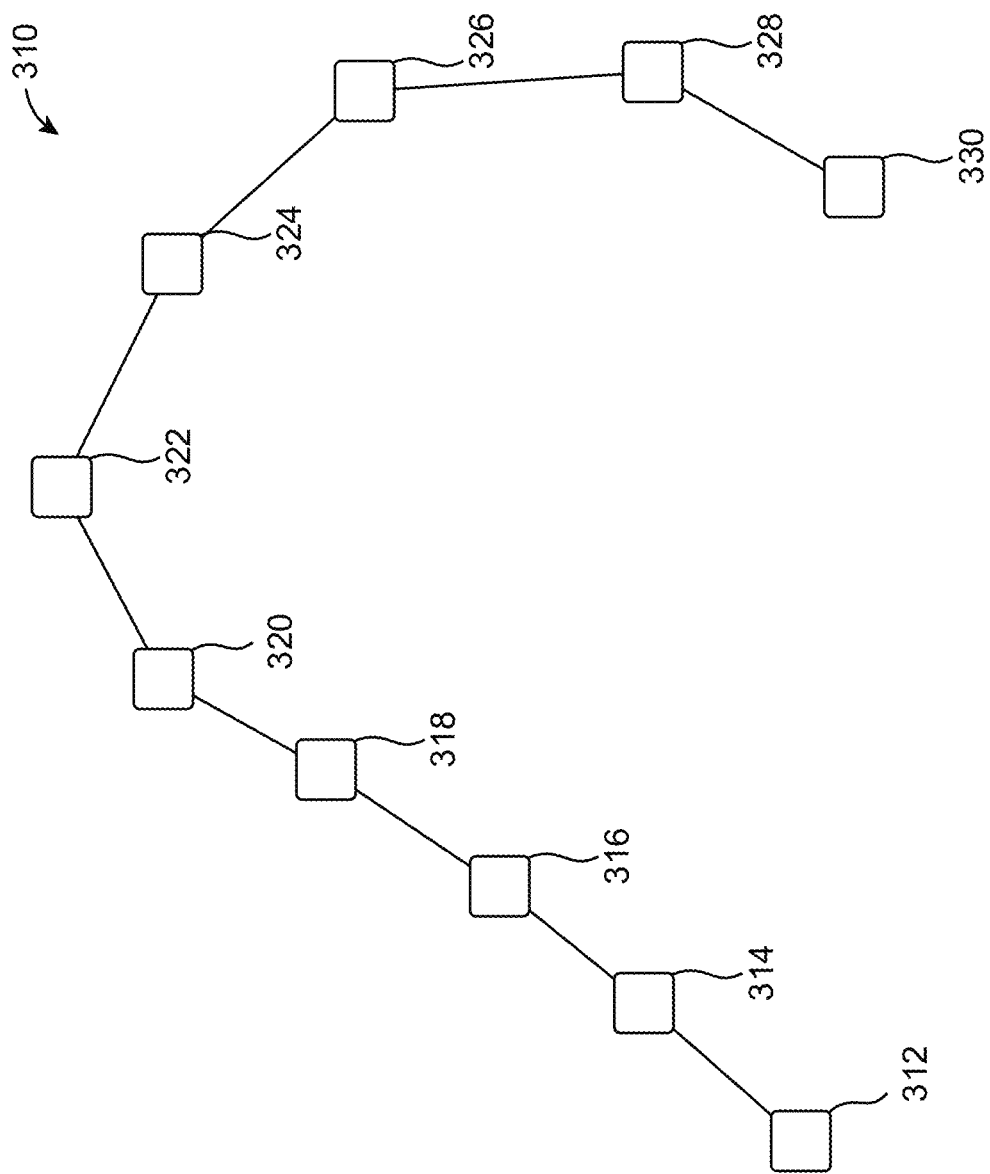
FIG. 3B illustrates an example path between two nodes within a graph.

FIG. 3B illustrates an example path 310 between two nodes within a graph. For example, the path 310 may represent a connection between two nodes in the graph shown in expansion 308 of FIG. 3A, which may include a large number of nodes and edges. The nodes and edges of the graph may be explored to find the path 310. The path 310 may include nine hops between two nodes 312, 330. The nodes 314, 316, 318, 320, 322, 324, 326, 328 between the two nodes 312, 330 may represent associated objects discovered based on hard-link searches and/or soft-link searches. For example, the node 312 may represent a person A-1 and the node 330 may represent a person B-1. The node 314 may represent a document A associated with the person A-1 and the node 328 may represent a document B associated with the person B-1. The node 316 may represent a person A-2 associated with the document A and the node 326 may represent a person B-2 associated with the document B. The node 318 may represent a mobile device A of the person A-2 and the node 324 may represent a mobile device B of the person B-2. The node 320 may represent a cellular communication tower ping of the mobile device A and the node 322 may represent a cellular communication tower ping of the mobile device B. The cellular communication tower pings of the mobile device A and the mobile device B may indicate that the two mobile devices were in the same location and the same time. The path 310 may show that two persons of interest, person A-1 and person B-1, are connected to each other based on documents of the persons A-1, B-1 (nodes 314, 328), persons associated with the documents (nodes 316, 326), mobile devices of the associated persons (nodes 318, 324), and locations of the mobile devices (nodes 320, 322) indicating that the associated persons were present in the same location at the same time. Other types of connections between nodes are contemplated.

Figure 4A:
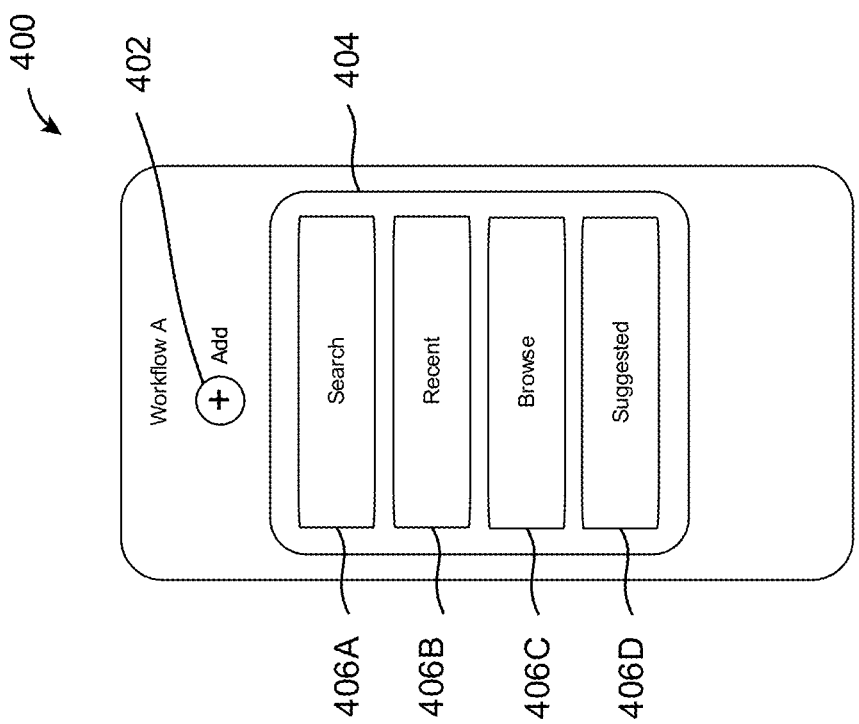
FIG. 4A illustrates an example interface for providing workflow assistance for performing operations on information, in accordance with various embodiments.
Figure 4B:
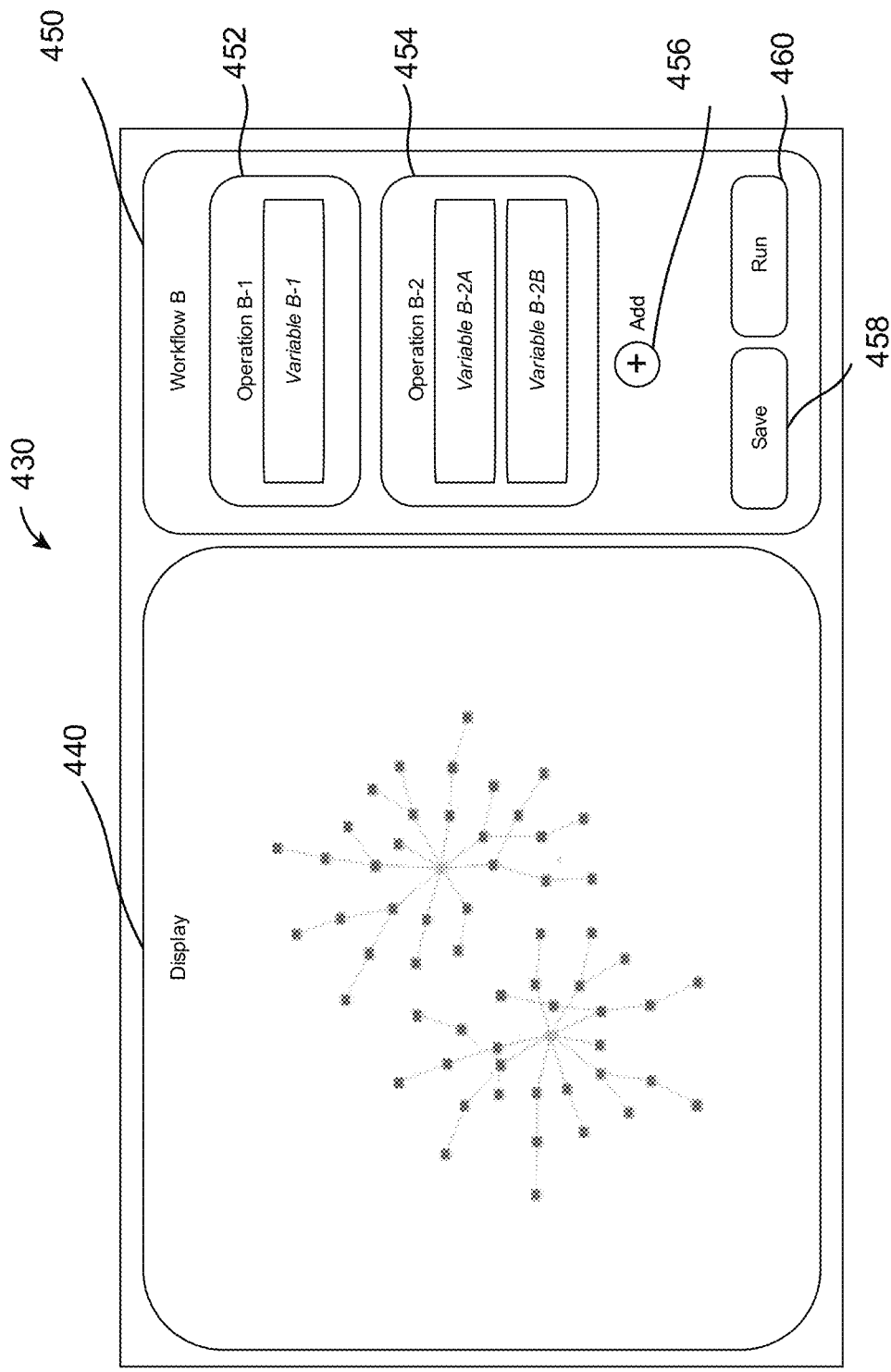
FIG. 4B illustrates another example interface for providing workflow assistance for performing operations on information, in accordance with various embodiments.

FIGS. 4A-4B illustrate example user interfaces 400, 430 for providing workflow assistance, in accordance with various embodiments. In various embodiments, the user interfaces 400, 430 may be accessed through a software application running on a computing device (e.g., computers, mobile phones, tablets, etc.) that includes one or more processors and memory. For example, the user interfaces 400, 430 may be accessible through a web browser. In another example, the user interfaces 400, 430 may be provided through a data analysis application. In yet another example, the user interfaces 400, 430 may be provided as a service over a network (e.g., software as a service). Depending on the computing device, the user may be able to interact with the user interfaces 400, 430 using various input devices (e.g., keyboard, mouse, etc.) and/or touch/gestures. The user interfaces 400, 430 are provided merely as examples and, naturally, the arrangement and configuration of such user interfaces can vary depending on the implementation. Thus, depending on the implementation, the user interfaces 400, 430 may include additional features and/or alternative features. The user interfaces 400, 430 may include/enable one or more functionalities of the interface(s) described above with respect to the computing system 102/components of the computing system 102.

Referring to FIG. 4A, the user interface 400 may include an add option 402 and an operation selection section 404. The add option 402 may enable users to add an operation to a workflow (e.g., workflow A). In some embodiments, the operation selection section 404 may be displayed in response to users' interaction with the add option 402. The operation selection section 404 may enable users to select an operation for inclusion in the workflow A. For example, the operation selection section 404 may include a search field 406A, a recent field 406B, a browse field 406C, and a suggested field 406D. The search field 406A may enable users to search for particular operations based on names of operations, keywords of operations, transformations/processes performed by operations, and/or other information relating to operations. The recent field 406B may provide a list of recent operations selected/used by users. The recent field 406B may provide a list of recent operations within a given project. That is, the recent field 406B may provide different lists of recent operations for different projects. The browse field 406C may enable users to browse for operations. For example, the browse field 406C may enable users to browse for operations alphabetically, based on operation type, based on filters, and/or other information. The suggested field 406D may lists operations which are suggested for inclusion in the workflow A.

Referring to FIG. 4B, the user interface 430 may include a display section 440 and a workflow section 450. The workflow section 450 may provide information relating to a workflow of operations. The workflow section 450 may display operations selected by users for inclusion in a workflow. For example, the workflow section 450 may display operation B-1 and operation B-2 selected by users for inclusion in a workflow B. The workflow section 450 may include sections 452, 454 that correspond to operations B-1, B-2, respectively. The sections 452, 454 may identify the selected operations and display variables for the operations. The sections 452, 454 may enable users to select, change, remove values for the variables of the operations. The sections 452, 454 may provide suggested values for the variables of the selected operations. The workflow section 450 may include an add option 456, a save option 458, and a run option 460. The add option 456 may enable users to add an operation to the workflow of information. The add option 456 may be displayed at the end of the list of operations and/or at other locations. For example, the add option 456 may be display between the sections 452, 454 to add an operation between operations B-1 and B-2. The save option 458 may enable users to save a particular workflow of operations. The run option 460 may enable users to execute a particular workflow of operations.

The display section 440 may display visual information relating to accessed information, such as a graph defined by the accessed information. The display section may display a result of applying one or more operations on the graph. For example, the graph displayed in the display section 440 may change based on execution of operations within a workflow of operations. For example, the graph displayed in the display section 440 may change based on execution of operation B-1 and execution of operation B-2. The display section 440 may enable users to select particular portions of the graph. For example, users may use the display section to select one or more nodes/edges for which operations are desired.

The display section 440 may display information from other applications based on information generated by the workflow of operations. For example, one or more intermediate and/or final outputs of a workflow of operations may be provided to an integrated application to provide an integrated view of the outputs. For example, outputs of a workflow of operations may be provided to a mapping application to provide a view of the results in conjunction with a map. Such a view may enable users to find geographical patterns in the result. Integration with other types of applications are contemplated. In some embodiments, the display section 440 may import views of an integrated application into the user interface 450. That is, rather than simply taking a snapshot of a view from the integrated application and/or using outputs of the integrated application to provide a view, an instance of the integrated application may be shown within the display section 440 to allow users to interact with the integrated application through the display section 440.

Figure 5:
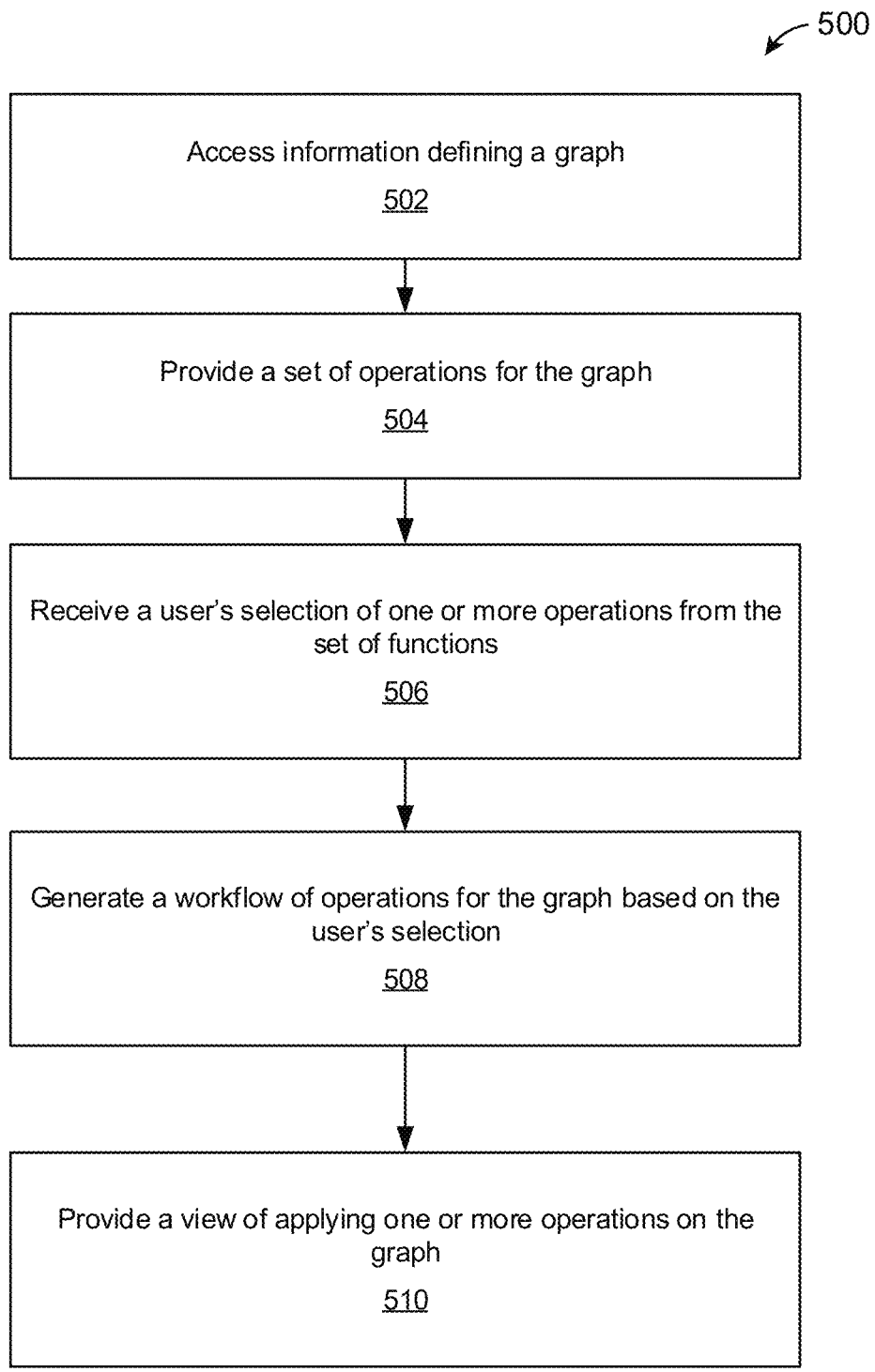
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, information defining a graph may be accessed. At block 504, a set of operations for the graph may be provided. At block 506, a user's selection of one or more operations from the set of operations may be received. At block 508, a workflow of operations for the graph may be generated based on the user's selection. The workflow of operations may include the operation(s) selected by the user. At block 510, a view of applying one or more operations on the graph may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
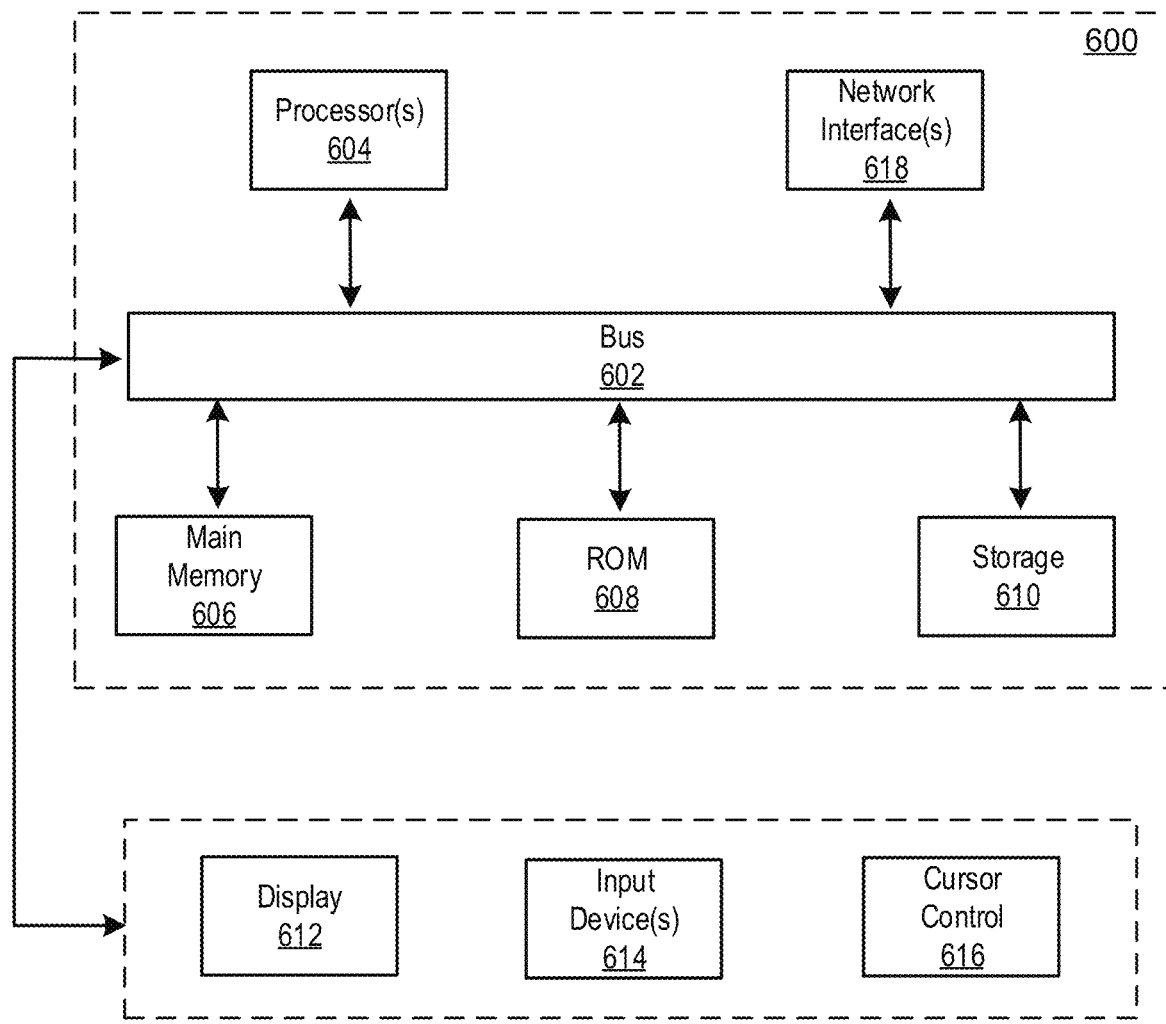
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors;
a memory storing instructions that, when executed by the one or more processors, cause the system to perform:
  extracting, from a database, information of:
    a first signal;
    a second signal detected within a threshold distance and a threshold time of the first signal being detected;
    a first device associated with the first signal;
    a second device associated with the second signal;
    a first entity associated with the first device;
    a second entity associated with the second device; and
    an object associated with the first entity or the second entity;
  representing, as separate nodes of a graph, the first signal, the second signal, the first device, the second device, the first entity, the second entity, and the object;
  representing, as links connecting the separate nodes of the graph, connections among the first signal, the second signal, the first device, the second device, the first entity, the second entity, and the object;
  providing a set of predefined operations that analyze, modify, and visualize the information of at least one of the first signal, the second signal, the first device, the second device, the first entity, the second entity, or the object, on the graph, the set of predefined operations including a set of macros;
  receiving a user selection of an operation from the set of predefined operations; and
  generating a workflow of operations based on the user selection, the workflow of operations including the operation selected by the user; and displaying a difference between the graph before the operation and the graph after the operation.

2. The system of claim 1, wherein providing the set of operations for the graph includes displaying a workflow generation interface, the workflow generation interface comprising a search field in which a user enters commands to search for existing operations.

3. The system of claim 2, wherein the workflow generation interface comprises a button that, in response to being clicked, creates new operations.

4. The system of claim 2, wherein the workflow generation interface further comprises a section of the workflow generation interface, separate from the search field, that displays a result of applying a given operation on the graph.

5. The system of claim 1, wherein the set of predefined operations further includes an operation that creates new information from the information and visualizes the newly created information in the graph.

6. The system of claim 1, wherein the set of predefined operations further includes an operation that combines the information with other information and visualizes the combined information in the graph.

7. A method implemented by a computing system including one or more processors and storage media storing machine-readable instructions, wherein the method is performed using the one or more processors, the method comprising:
extracting, from a database, information of:
a first signal;
a second signal detected within a threshold distance and a threshold time of the first signal being detected;
a first device associated with the first signal;
a second device associated with the second signal;
a first entity associated with the first device;
a second entity associated with the second device; and
an object associated with the first entity or the second entity;
representing, as separate nodes of a graph, the first signal, the second signal, the first device, the second device, the first entity, the second entity, and the object;
representing, as links connecting the separate nodes of the graph, connections among the first signal, the second signal, the first device, the second device, the first entity, the second entity, and the object;
providing a set of predefined operations that analyze, modify, and visualize the information of at least one of the first signal, the second signal, the first device, the second device, the first entity, the second entity, or the object, on the graph, the set of predefined operations including a set of macros;
receiving a user selection of an operation from the set of predefined operations; and
generating a workflow of operations based on the user selection, the workflow of operations including the operation selected by the user; and
displaying a difference between the graph before the operation and the graph after the operation.

8. The method of claim 7, wherein providing the set of operations for the graph includes displaying a workflow generation interface, the workflow generation interface comprising a search field in which the user enters commands to search for existing operations.

9. The method of claim 8, wherein the workflow generation interface comprises a button that, in response to being clicked, creates new operations.

10. The method of claim 8, wherein the workflow generation interface further comprises a section of the workflow generation interface, separate from the search field, that displays a result of applying a given operation on the graph.

11. A non-transitory computer readable medium comprising instructions that, when executed, cause one or more processors to perform:
extracting, from a database, information of:
a first signal;
a second signal detected within a threshold distance and a threshold time of the first signal being;
a first device associated with the first signal;
a second device associated with the second signal;
a first entity associated with the first device;
a second entity associated with the second device; and
an object associated with the first entity or the second entity;
representing, as separate nodes of a graph, the first signal, the second signal, the first device, the second device, the first entity, the second entity, and the object;
representing, as links connecting the separate nodes of the graph, connections among the first signal, the second signal, the first device, the second device, the first entity, the second entity, and the object;
providing a set of predefined operations that analyze, modify, and visualize the information of at least one of the first signal, the second signal, the first device, the second device, the first entity, the second entity, or the object, on the graph, the set of predefined operations including a set of macros;
receiving a user selection of an operation from the set of predefined operations; and
generating a workflow of operations based on the user selection, the workflow of operations including the operation selected by the user; and
displaying a difference between the graph before the operation and the graph after the operation.

12. The non-transitory computer readable medium of claim 11, wherein providing the set of operations for the graph includes displaying a workflow generation interface, the workflow generation interface comprising a search field in which the user enters commands to search for existing operations.

13. The non-transitory computer readable medium of claim 12, wherein the workflow generation interface comprises a button that, in response to being clicked, creates new operations.

14. The non-transitory computer readable medium of claim 12, wherein the workflow generation interface further comprises a section of the workflow generation interface, separate from the search field, that displays a result of applying a given operation on the graph.

* * * * *